US011790646B2

(12) United States Patent
Kilickaya et al.

(10) Patent No.: US 11,790,646 B2
(45) Date of Patent: Oct. 17, 2023

(54) NETWORK FOR INTERACTED OBJECT LOCALIZATION

(71) Applicant: QUALCOMM Technologies, Inc., San Diego, CA (US)

(72) Inventors: Mert Kilickaya, Amsterdam (NL); Arnold Wilhelmus Maria Smeulders, Amsterdam (NL)

(73) Assignee: QUALCOMM Technologies, Inc., San Diego, CA (US)

(*) Notice: Subject to any disclaimer, the term of this patent is extended or adjusted under 35 U.S.C. 154(b) by 133 days.

(21) Appl. No.: 17/359,379

(22) Filed: Jun. 25, 2021

(65) Prior Publication Data

US 2022/0414371 A1    Dec. 29, 2022

(51) Int. Cl.
*G06V 20/00* (2022.01)
*G06V 40/10* (2022.01)
*G06V 10/75* (2022.01)
*G06F 18/241* (2023.01)
*G06F 18/213* (2023.01)

(52) U.S. Cl.
CPC ............ *G06V 20/00* (2022.01); *G06F 18/213* (2023.01); *G06F 18/241* (2023.01); *G06V 10/751* (2022.01); *G06V 40/10* (2022.01)

(58) Field of Classification Search
CPC ...... G06V 20/00; G06V 40/10; G06V 10/751; G06K 9/6232; G06K 9/6268
See application file for complete search history.

(56) References Cited

U.S. PATENT DOCUMENTS

2018/0101955 A1* 4/2018 Varadarajan .......... G06V 40/20

OTHER PUBLICATIONS

Zhou et al. "Cascaded human-object interaction recognition"; Proceedings of the IEEE/CVF Conference on Computer Vision and Pattern Recognition; (Year: 2020).*
Liu et al. "Detecting human-object interaction with multi-level pairwise feature network"; Computational Visual Media 7.2: 229-239 (Year: 2021).*
Zhouu et al. "Cascaded human-object interaction recognition"; Proceedings of the IEEE/CVF Conference on Computer Vision and Pattern Recognition; (Year: 2020).*
Chao Y W., et al., "Learning to Detect Human-Object Interactions", arxiv.org, Cornell University Library, 201 OLIN ibrary Cornell University Ithaca, NY 14853, Feb. 17, 2017 (Feb. 17, 2017), XP080746167, pp. 381-389.
Gao C., et al., "iCAN: Instance-Centric Attention Network for Human-Object Interaction Detection", Aug. 30, 2018 (Aug. 30, 2018), 13 Pages, XP055957091, [retrieved on Sep. 1, 2022].
International Search Report and Written Opinion—PCT/US2022/035186—ISA/EPO—dated Sep. 14, 2022.

(Continued)

*Primary Examiner* — Sumati Lefkowitz
*Assistant Examiner* — Michael Adam Shariff
(74) *Attorney, Agent, or Firm* — QUALCOMM Technologies, Inc.

(57) ABSTRACT

A method for human-object interaction detection includes receiving an image. A set of features are extracted from multiple positions of the image. One or more human-object pairs may be predicted based on the extracted set of features. A human-object interaction may be determined based on a set of candidate interactions and the predicted human-object pairs.

28 Claims, 8 Drawing Sheets

(56) References Cited

OTHER PUBLICATIONS

Liu H., et al., "Detecting Human-Object Interaction with Multi-Level Pairwise Feature Network", Computational Visual Media, vol. 7, No. 2, Oct. 19, 2020 (Oct. 19, 2020), pp. 229-239.
Zhou T., et al., "Cascaded Human-Object Interaction Recognition", 2020 IEEE/CVF Conference on Computer Vision and Pattern Recognition (CVPR), IEEE, Jun. 13, 2020 (Jun. 13, 2020), pp. 4262-4271.

\* cited by examiner

NETWORK FOR INTERACTED OBJECT LOCALIZATION

BACKGROUND

Field

Aspects of the present disclosure generally relate to image recognition, and more particularly to human-object interaction detection.

Background

Humans interact with many objects on a daily basis. Humans are able to localize and grasp even unknown objects successfully. Therefore, human-object interaction detection attempts to learn interactions automatically from images or videos. One goal of human-object interaction detection is, given an image, to predict a triplet of <human, interaction, object> where human (interactor) and objects (interactee) are represented by a bounding box, and the interaction is a <verb, noun> tuple, such as <ride, bicycle>.

Conventional models first detect a set of possible human positions and detect a set of possible object positions. Then, all possible human positions and all possible object positions are exhaustively paired as a candidate interactor-interactee pair. Each of these candidate interactor (e.g., human)-interactee (e.g., object) pairs is assigned to an interaction category or a background no-interaction category in case they do not interact. Unfortunately, an exhaustive pairing of M human and N object detections would lead to (M*N) pairings, and thus may be computationally expensive and burdensome.

Another conventional approach attempts to learn a scoring function on top of human-object pairs based on their global appearance. An un-directed graph of all human and object detections within the image is generated. Then, non-interacting pairs (nodes) of human-objects within the graph are pruned out. However, this conventional approach also evaluates O(M*N) pairs of human-object pairings to yield a binary interaction decision, and thus is computationally expensive and inefficient. Additionally, such approaches operate on human-object bounding box appearance, and thus limit a holistic understanding of the image. Furthermore, these conventional techniques fail to generalize to unseen objects of interactions, limiting the transferability.

SUMMARY

The present disclosure is set forth in the independent claims, respectively. Some aspects of the disclosure are described in the dependent claims.

In an aspect of the present disclosure, a method is provided. The method includes receiving an image. The method also includes extracting a first set of features from multiple positions of the image. Additionally, the method includes predicting human-object pairs based on the extracted first set of features. Further, the method includes determining a human-object interaction based on a set of candidate interactions and the predicted human-object pairs.

In an aspect of the present disclosure, an apparatus is provided. The apparatus includes a memory and one or more processors coupled to the memory. The processor(s) are configured to receive an image. The processor(s) are also configured to extract a first set of features from multiple positions of the image. In addition, the processor(s) are configured to predict human-object pairs based on the extracted first set of features. Further, the processor(s) are configured to determine a human-object interaction based on a set of candidate interactions and the predicted human-object pairs.

In an aspect of the present disclosure, an apparatus is provided. The apparatus includes means for receiving an image. The apparatus also includes means for extracting a first set of features from multiple positions of the image. Additionally, the apparatus includes means for predicting human-object pairs based on the extracted first set of features. Further, the apparatus includes means for determining a human-object interaction based on a set of candidate interactions and the predicted human-object pairs.

In an aspect of the present disclosure, a non-transitory computer readable medium is provided. The computer readable medium has encoded thereon program code. The program code is executed by a processor and includes code to receive an image. The program code also includes code to extract a first set of features from multiple positions of the image. Additionally, the program code includes code to predict human-object pairs based on the extracted first set of features. Furthermore, the program code includes code to determine a human-object interaction based on a set of candidate interactions and the predicted human-object pairs.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
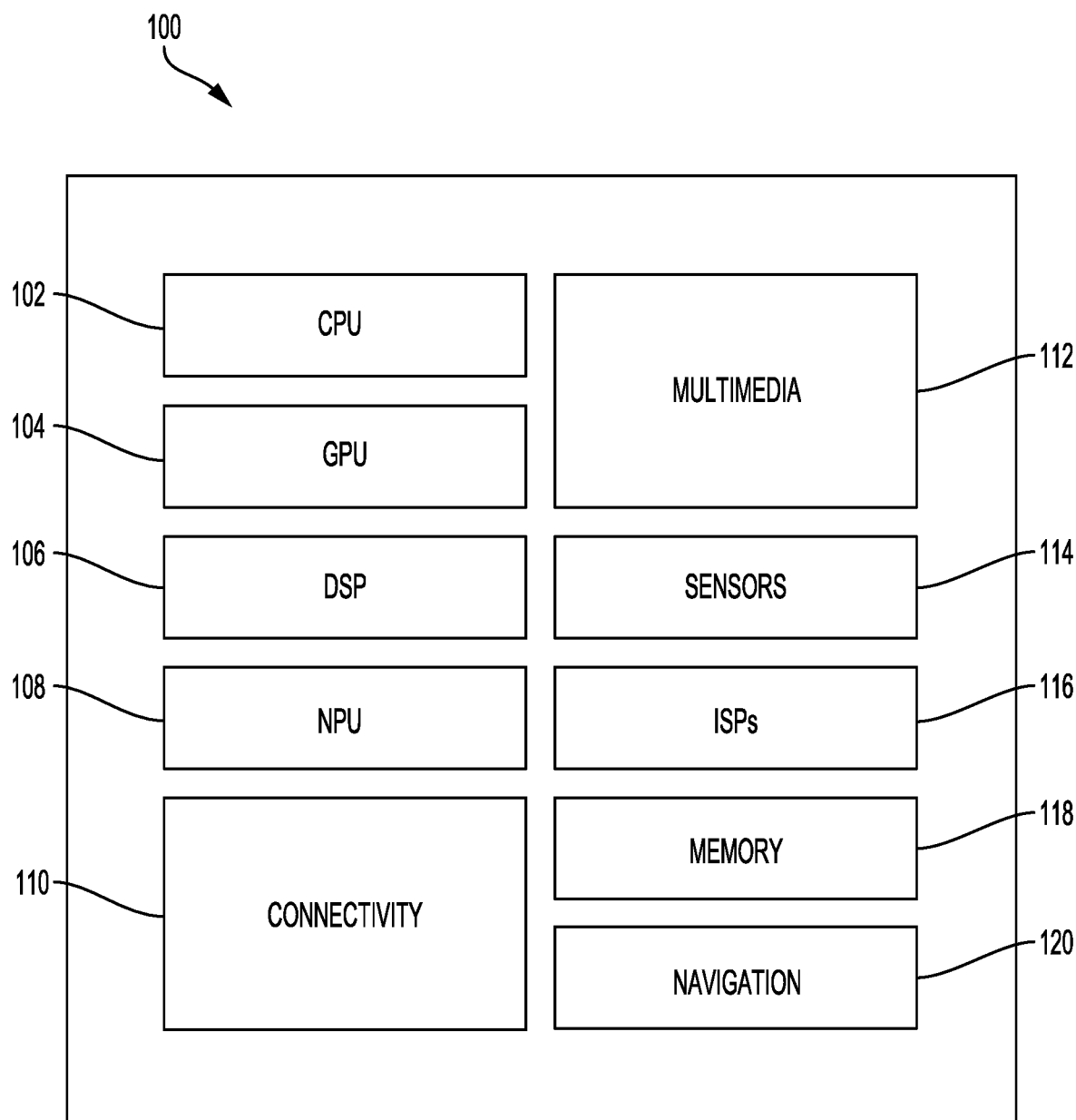
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Humans interact with many objects on a daily basis that may be captured in single images. Humans are able to localize and grasp even unknown objects successfully. Human-object interaction (HOI) detection is a fundamental task in computer vision that aims to detect human-object pairs in an image and classify their interactions. In doing so, one task is identifying the interacting human-object pairs prior to classification.

Conventional models attempt to tackle this problem by training deep convolutional neural networks (CNNs) via strong instance supervision. Instance supervision aligns humans with their interacted objects, and then aligns interactions with each human-object pair(s). Unfortunately, collecting such instance supervision is expensive. Additionally, conventional approaches operate on region-of-interest (RoI) pooled regions, and may neglect useful contextual information. Moreover, some conventional approaches may handcraft multiple contextual streams to account for the loss of contextual information, but such conventional approaches may increase model complexity, thereby limiting the performance, and break the end-to-end training paradigm.

Accordingly, aspects of the present disclosure are directed to human-object interaction detection. In some aspects, the human-object interaction may be detected without alignment supervision. In accordance with aspects of the present disclosure, image-level HOI supervision lists existing HOI within the image without aligning them to human-object instances. A visual transformer-based architecture may learn to align human-objects and interactions by image-level supervision. An HOI alignment layer may determine the likelihood of human-object interactions based on geometric and visual priors, for instance.

In some aspects, the HOI detection may be performed via a single-stage, single-stream visual transformer-based architecture that may be trained in an end-to-end manner. At the core of an align-former technique is an HOI selection module that judges the likelihood of <human (h'), object (o'), interaction (y')> triplets from all potential pairs. It does so by calculating geometric as well as visual compatibility with the list of interactions within the image. Align-former is trained to find the triplets with the minimum cost/maximum reward using a differentiable hard-threshold function.

FIG. 1 illustrates an example implementation of a system-on-a-chip (SOC) 100, which may include a central processing unit (CPU) 102 or a multi-core CPU configured for human-object interaction detection (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive an image. The general-purpose processor 102 may also include code to extract a first set of features from multiple positions of the image. The general-purpose processor 102 may also include code to predict human-object pairs based on the extracted first set of features. The general-purpose processor 102 may further include code to determine a human-object interaction based on a set of candidate interactions and the predicted human-object pairs.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
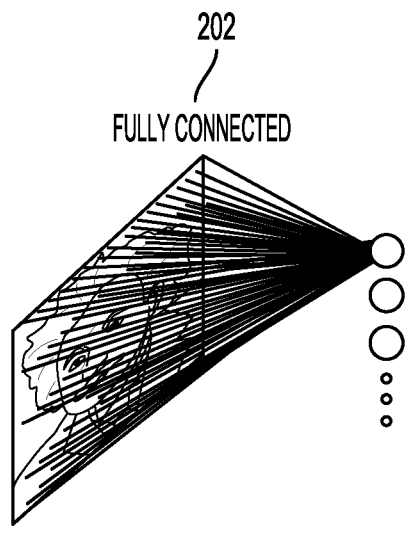
FIGS. 2A, 2B, and 2C are diagrams illustrating a neural network in accordance with aspects of the present disclosure.
Figure 2B:
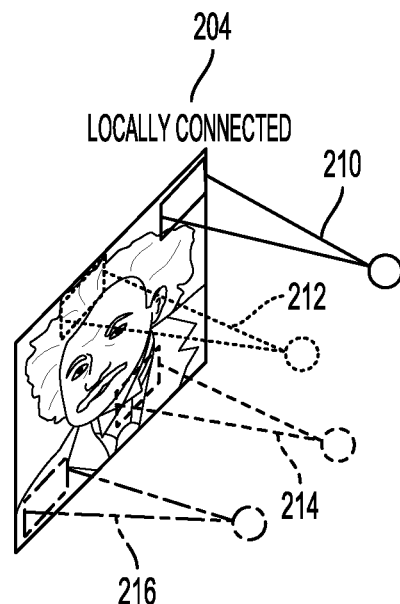

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
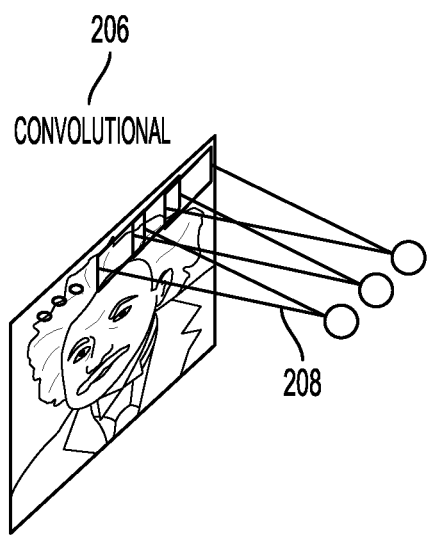

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
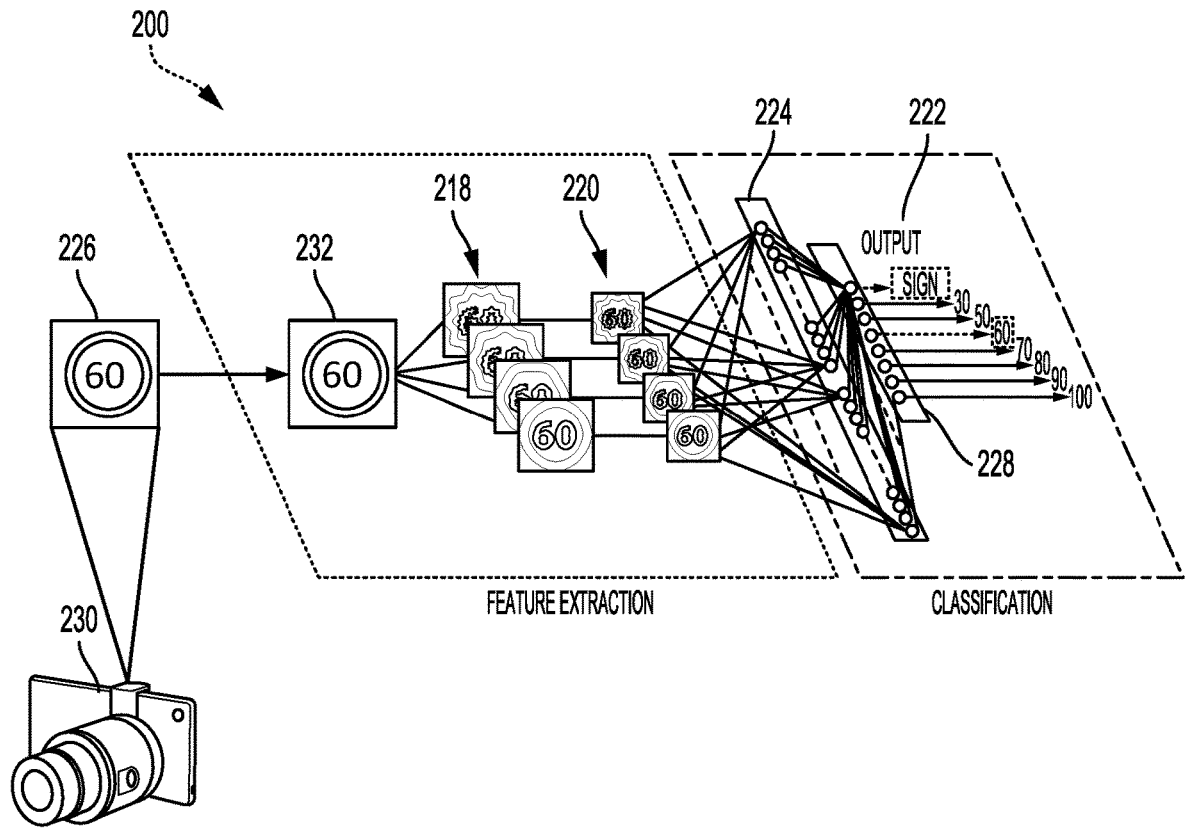
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
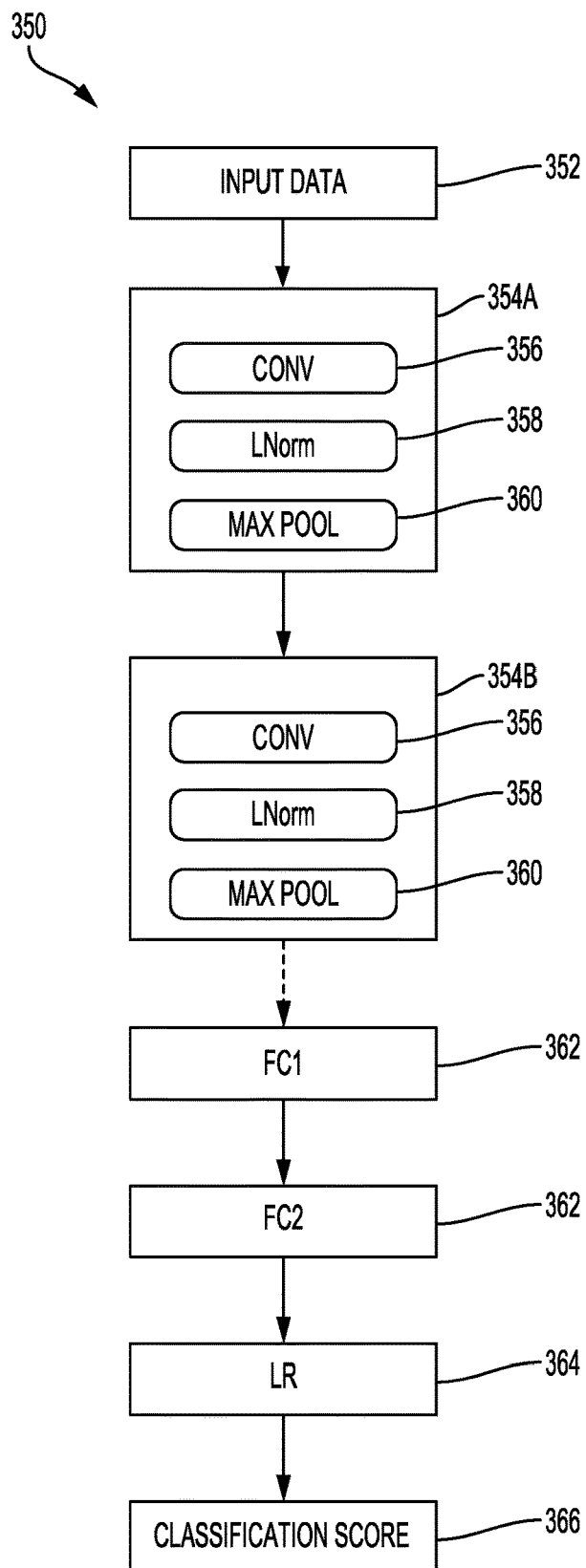
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
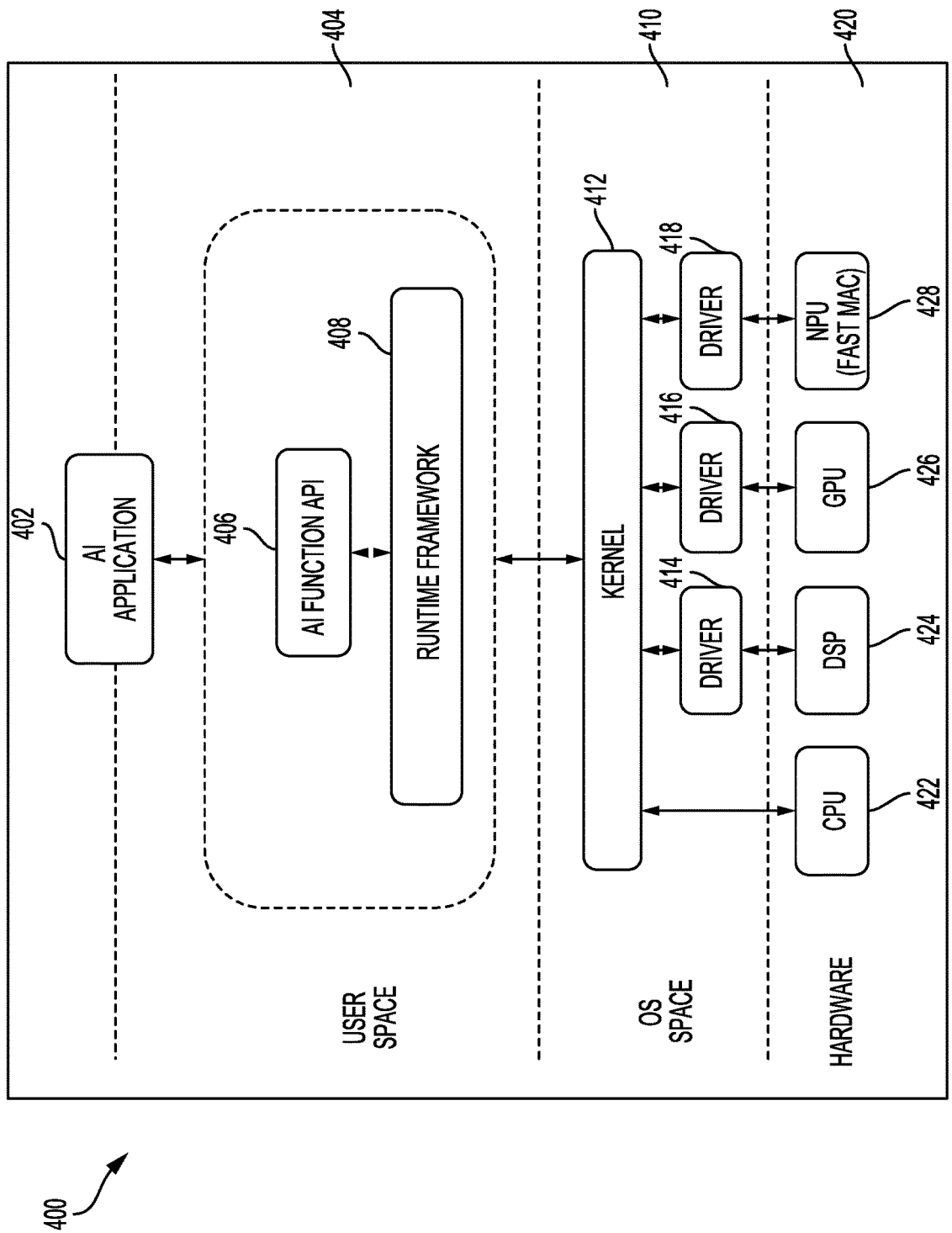
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428, if present.

Human-object interaction (HOI) detection is the localization of a human and an object in an image, and the classification of an interaction between them. One goal of HOI is to identify the position of an interactor (e.g., human), position of interactee (e.g., horse), and a type of interaction (e.g., riding, sitting on).

Aspects of the present disclosure are directed to detection of HOI from an input image via image-level supervision. An input image I may be mapped to an HOI output t' using a neural network $g_\theta(\cdot)$ as $$I \xrightarrow{g_\theta(\cdot)} t',$$

where $t' = \langle h', o', y' \rangle$ and within the triplet $(h', o', y')$, $(h', o')$ are human-object bounding box pairs, and $y' = (y_{verb}', y_{noun}')$ verb-noun pair interaction predictions. Because instance-level human-object and human-object-interaction pair alignment is not accessible, an objective may be expressed as follows:

$$\min_\theta \bigl(A(t), A^T(t')\bigr) \qquad (1)$$

where $A \in \mathbb{R}^{P \times T}$ is a binary alignment matrix $A \in \{0,1\}$, where only a few entries are non-zero, which aligns T HOI targets $T=|t|$ with P HOI predictions $P=|t'|$. In a given image with multiple humans and objects, only a few human-object pairs may be in involved in an interaction, while the remaining pairs may be non-interacting.

To create target entries of size T, human and object detections may be sampled, for instance, using an off-the-shelf detector. The detected human and object instances may be exhaustively paired while repeating image-wise HOI annotations across all humans and objects.

Figure 5:
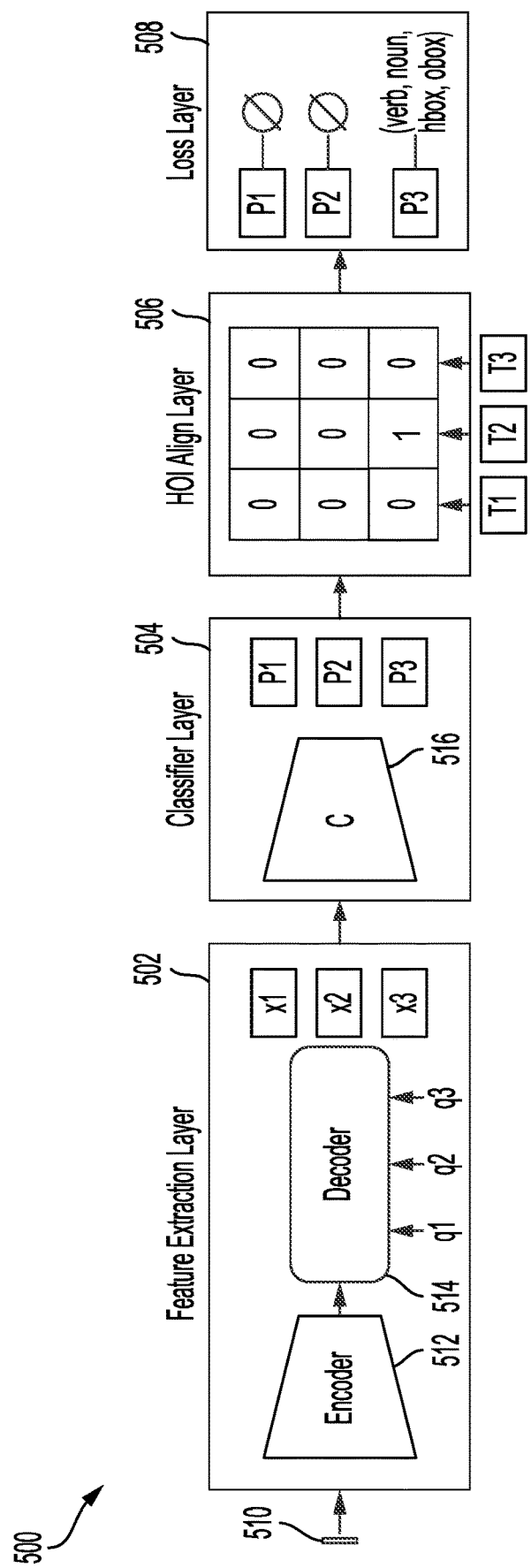
FIG. 5 is a block diagram illustrating an example architecture for human-object interaction (HOI) detection, in accordance with aspects of the present disclosure.

FIG. 5 is a block diagram illustrating an example architecture 500 for HOI detection, in accordance with aspects of the present disclosure. Referring to FIG. 5, the example architecture 500 may include a feature extraction layer 502, a classifier layer 504, an HOI alignment layer 506, and a loss layer 508. The feature extraction layer 502 may receive an input 510, such as an image, for example. The feature extraction layer 502 may extract features of the input 510 (e.g., image). In some examples, the feature extraction layer 502 may be configured as a multi-layer, multi-head visual transformer architecture that yields human-object features $x_{ho} \in \mathbb{R}^{P \times D}$ for P regions represented by D dimension of the input 510 (e.g., image). The visual transformer (not shown) may be a convolutional neural network (e.g., 350 shown in FIG. 3) and may transform the input 510 by mapping the input 510 (e.g., an image $I \in \mathbb{R}^{H_0 \times W_0 \times C_0}$) to a lower resolution (e.g., via a last convolutional layer of a neural network) as $x \in \mathbb{R}^{H \times W \times C}$.

In the example architecture 500, the feature extraction layer 502 may include an encoder 512 and a decoder 514, for instance. In some aspects, the encoder 512 and decoder 514 may be included following the visual transformer architecture such that the input of the encoder 512 may be x. As such, the encoder 512 may reduce the channel dimensionality of the x via 1×1 convolutions to $x \in \mathbb{R}^{H \times W \times D}$. Then, the spatial dimension of this input feature may be collapsed into $x \in \mathbb{R}^{D \times HW}$, where each pixel of the image I becomes a "token" representing D features. In some aspects, the token may be further processed via additional convolutional layers (e.g., of a multi-layer perceptron) or residual operations and dropout. In some aspects, the encoder may learn an embedding of fixed positional information. That is, the encoder 512 may learn to incorporate the fixed positional information in the input feature (e.g., token). The fixed positional information may, for example, be the absolute x-y indexes of the pixel locations (and the feature map).

The token may be supplied to the decoder 514. The decoder 514 may be applied to query the token with a fixed positional embedding $Q \in \mathbb{R}^{N \times D}$. The fixed positional embedding Q may be processed using self-attention operations to encode query-to-query relations, as well as cross-attention to encode query-to-image relations, which finally will yield $x_{ho} \in \mathbb{R}^{N \times D}$. That is, the decoder 514 alternates between the cross-attention between the feature map x and the fixed positional information of embedding Q, as well as self-attention across queries. Cross-attention extracts features from the global feature maps, whereas self-attention represents object-object relations for HOI detection. In cross-attention, the human-object features aggregate information from global feature map pixels (e.g., cross between human-objects and global feature map). On the other hand, n self-attention, each pixel aggregates information from each of the other pixels (self) within the global image feature map. The decoder 514 outputs a set of human-object features (e.g., x1, x2, x3) in each position (e.g., region of the image), which are supplied to the classifier layer 504.

The classifier layer 504 includes a classifier (C) 516 that receives human-object features at each position of the input 510 (e.g., image). In some aspects, the classifier layer 504 may include bounding box classifiers to predict human and object bounding boxes and a verb-noun classifier. For example, the bounding box classifiers may be three-layer multi-layer perceptrons (MLPs) that generate four-dimensional outputs representing top left corner coordinates and the width-height of the bounding box. The verb-noun classifier maps the input features to the set of verb and object categories separately. In some cases, there may be multiple interaction verbs with a single object.

The human and object features at the respective positions (e.g., x1, x2, x3) may be processed to generate a prediction P of whether the human and object interaction is detected at each position. Although, three positions are used in the example, this is merely for ease of illustration and not limiting. The HOI predictions P may be supplied to the HOI alignment layer 506.

The HOI alignment layer 506 may include multiple sub-layers. For example, the HOI alignment layer 506 may include a priors layer that scores a likelihood of interaction match for a given target-prediction pair. The HOI alignment layer 506 may also include a discretization layer (not shown) that binarizes the scoring function to yield final alignment as output of the HOI alignment layer 506 (only the output of the HOI alignment layer is shown for ease of illustration) where 0 may indicate no alignment (the human and object do not interact) and a '1' may indicate alignment (e.g., the human and object interact). In turn, a verb-noun pair or an interaction prediction for the aligned human and object may be determined.

The loss layer 508 computes an HOI detection loss based on the HOI prediction P. The example architecture 500 may be trained to optimize the following composite objective:

$$\mathcal{L} = \mathcal{L}_{box} + \mathcal{L}_{class} + \mathcal{L}_{sparse} \qquad (2)$$

where verb-noun losses $\mathcal{L}_{box}$ computes the $L_1$ distances between human-object predictions as $\mathcal{L}_{box} = \mathcal{L}_{human} + \mathcal{L}_{object}$. $\mathcal{L}_{class} = \mathcal{L}_{verb} + \mathcal{L}_{noun}$ and are classical cross entropy losses. In addition, aligned targets, and the sparsity loss $\mathcal{L}_{sparse}$ ensure that only a few entries of alignment matrix A are non-zero by minimizing its norm to provide $\mathcal{L}_{sparse} = \|A\|$.

Accordingly, the example architecture 500 may implement a network g(•) having the form:

$$g(I) = A^T(C(Dec(Enc(CNN(I)), Q))), \qquad (3)$$

where Dec(Enc(CNN(I)), Q) is an encoder-decoder human-object feature extractor using a backbone CNN(•) on top of the input image I, where $Q \in \mathbb{R}^{P \times D}$ is the set of fixed $\mathbb{R}$ positional queries, and C(•) is a set of bounding box and interaction classifiers.

Figure 6:
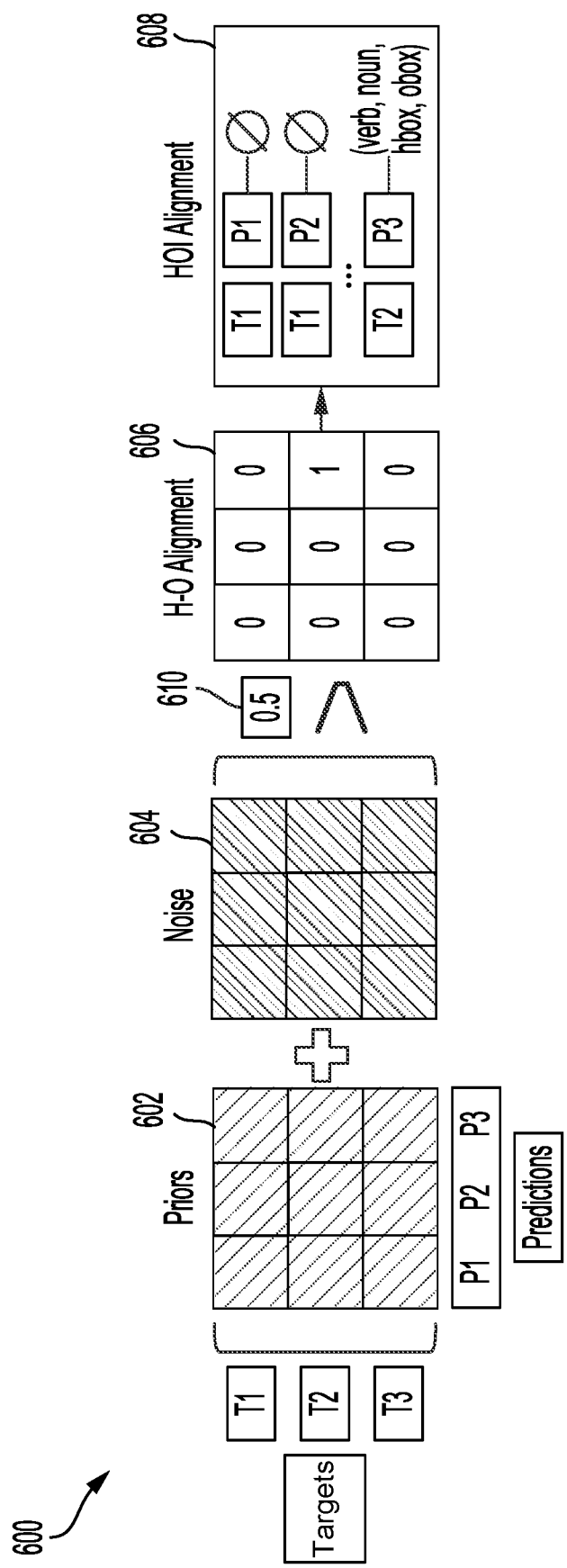
FIG. 6 is a diagram illustrating an example HOI alignment layer, in accordance with aspects of the present disclosure.

FIG. 6 is a diagram illustrating an example HOI alignment layer 600, in accordance with aspects of the present disclosure. Referring to FIG. 6, the HOI alignment layer 600 may receive, in a prior layer 602, a set of predictions P (e.g., P1, P2, P3) for a set of targets T (e.g., T1, T2, T3) or candidates in an image. The prior layer 602 may compute and output the scoring matrix S, which may indicate whether the target or candidate interaction is aligned with or matches the predicted human-object pair P. For instance, the scoring matrix $S \in \mathbb{R}^{P \times T}$ is a continuous-valued matrix of a scoring function in which S(i,j) indicates the likelihood of an alignment (e.g., match) between the ith target and the jth prediction.

In some aspects, a scoring matrix S may be such that only few members will be non-zeros. However, such discretization operation is non-differentiable. To that end, a Gumbel-Softmax technique may be employed to allow training. Specifically, given raw values of S, the following operation may be applied:

$$A = \sigma(S + G) \geq \delta, \qquad (4)$$

where δ is a predefined threshold value (e.g., δ=0.5), G is the Gumbel noise (e.g. noise 604) added to the matrix S, and σ(•) is the sigmoid activation to bound the scoring matrix S between [0,1]. This operation may thus yield a binary matrix $A \in \{0,1\}$ (e.g., H-O alignment 606), where only few matching entries are non-zero. Based on the non-zero entries, one or more human-object interactions may be detected 608. Additionally, in some aspects, the interaction between the human and object may be classified such that a prediction of a verb-noun pair, which indicates a type of interaction may be determined.

In some examples, the prior layer 602 may output a scoring matrix S, which is a convex combination of geometrical and visual priors: $S=\alpha_g*GP+\alpha_v*VP$, where GP is a geometric prior and VP is a visual prior, and $(\alpha_g, \alpha_v)$ re-weighs their contribution to the overall scoring matrix S. A convex combination is a linear combination of points where all coefficients are non-negative and sum to one.

The geometric prior GP may compute the compatibility of the spatial relation between the target and the predicted bounding boxes. For example, the L1 distance between all human-object bounding box pairs may be determined as:

$$GP=\Sigma_{ij}L1(h_i',h_j)+\Sigma_{ij}L1(o_i',o_j) \quad (5)$$

$$GP=\exp(-GP/\tau), \quad (6)$$

where $i\in\{0, 1, \ldots, P\}$ indexes the predictions, whereas $j\in\{0,1,\ldots,T\}$ indexes the target values. The geometric prior GP may be converted to a similarity by taking its negative exponential normalized by $\tau$, as shown in equation 6.

The visual prior VP, on the other hand, may compute how well a given prediction-target pair matches in terms of appearance. The visual prior may be determined based on a verb and noun classification within the image. The prediction pair(s) with the highest confidence for the target interaction categories (available via image-level HOI annotations) may receive the highest score. For example, the visual prior VP may be determined as follows:

$$VP=y_{verb}'*y_{verb}^T+y_{noun}'*y_{noun}^T, \quad (7)$$

where $y_{verb}'\in\mathbb{R}^{P\times V}$, $y_{verb}\in\mathbb{R}^{T\times V}$, $y_{noun}'\in\mathbb{R}^{P\times N}$, $y_{noun}\in\mathbb{R}^{T\times N}$ dimensional, where V is the number of distinct verbs and N is the number of distinct nouns.

Figure 7:
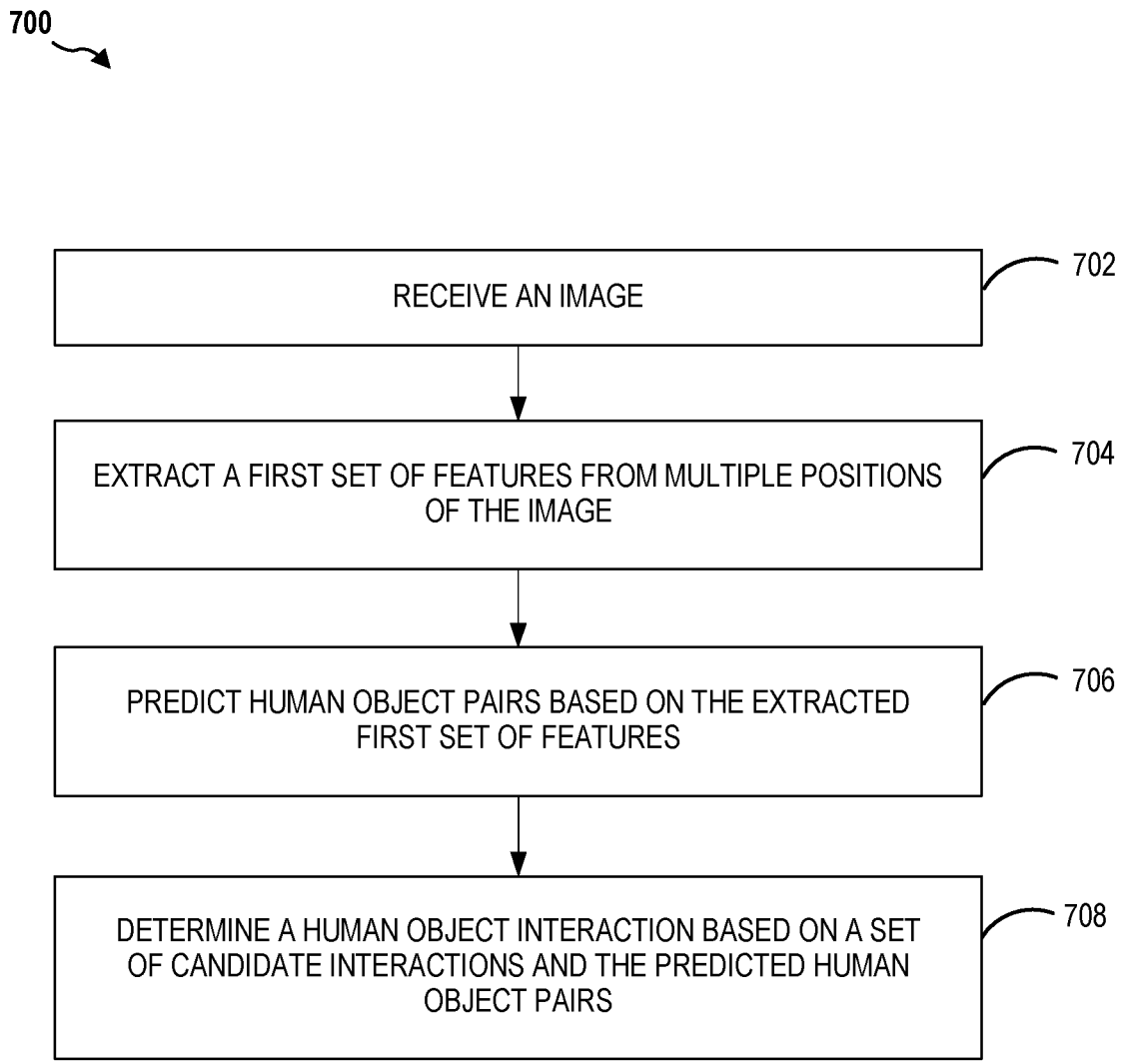
FIG. 7 is a flow chart illustrating a method for operating a neural network, in accordance with aspects of the present disclosure.

FIG. 7 is a flow chart illustrating a method 700 for detecting a human-object interaction, in accordance with aspects of the present disclosure. At block 702, the method 700 receives an image. For example, as shown in FIG. 5, the example architecture 500 receives an input 510, such as an image.

At block 704, the method 700 extracts a first set of features from multiple positions of the image. For instance, as described with reference to FIG. 5, the example architecture 500 includes a feature extraction layer 502 that extracts features of the input 510 (e.g., image). In some examples, the feature extraction layer 502 may be configured as a multi-layer, multi-head visual transformer architecture that yields human-object features $x_{ho}\in\mathbb{R}^{P\times D}$ for P regions represented by D dimension of the input 510 (e.g., an image). The visual transformer (not shown) may be a convolutional neural network (e.g., 350 shown in FIG. 3) and may transform the input 510 by mapping the input (e.g., an image $I\in\mathbb{R}^{H_0\times W_0\times C_0}$) to a lower resolution (e.g., via a last convolutional layer of a neural network) as $x\in\mathbb{R}^{H\times W\times C}$.

At block 706, the method 700 predicts human-object pairs based on the extracted first set of features. As described with reference to FIG. 5, the classifier layer 504 includes a classifier 516 that receives human-object features at each position of the input 510 (e.g., image). In some aspects, the classifier layer 504 may include bounding box classifiers to predict human and object bounding boxes and a verb-noun classifier. In some examples, the bounding box classifiers may be three-layer MLPs that generate four-dimensional outputs representing top left corner coordinates and the width-height of the bounding box. The verb-noun classifier maps the input features to the set of verb and object categories separately. In some cases, there may be multiple interaction verbs with a single object.

At block 708, the method 700 determines a human-object interaction based on a set of candidate interactions and the predicted human-object pairs. For example, as described with reference to FIGS. 5 and 6, the HOI alignment layer 506 and 600, respectively, may include a prior layer (e.g., 602) that scores a likelihood of interaction match for a given target-prediction pair. The HOI alignment layer 506, 600 may also include a discretization layer (not shown) that binarizes the scoring function to yield final alignment where '0' may indicate no alignment (the human and object do not interact) and a '1' may indicate alignment (e.g., the human and object interact). In some aspects, a verb-noun pair or an interaction prediction for the aligned human and object may also be determined.

In some aspects, the receiving means, the extracting means, the means for predicting and/or the determining means, for example, include the CPU 102, program memory associated with the CPU 102, the dedicated memory block 118, fully connected layers 362, the routing connection processing unit 216, and/or the CPU 422 configured to perform the functions recited. In other configurations, the aforementioned means may be any module or any apparatus configured to perform the functions recited by the aforementioned means.

Implementation examples are described in the following numbered clauses:

1. A method, comprising:
   receiving an image;
   extracting a first set of features from multiple positions of the image;
   predicting human-object pairs based on the extracted first set of features; and
   determining a human-object interaction based on a set of candidate interactions and the predicted human-object pairs.

2. The method of clause 1, in which the human-object pairs are determined based on a set of geometric priors or a set of visual priors.

3. The method of clause 1 or 2, in which the set of geometric priors are determined based on a spatial relation between a target human bounding box and a predicted human bounding box and between a target object bounding box and a predicted object bounding box.

4. The method of any of clauses 1-3, in which the set of visual priors are determined by computing a confidence metric comparing a verb-noun classification to the image.

5. The method of any of clauses 1-4, in which the human-object pairs are determined by comparing a score computed based on a sum of the geometric priors and visual priors to a predefined threshold.

6. The method of any of clauses 1-5 in which a human-object interaction is detected when the score is above the predefined threshold.

7. The method of any of clauses 1-6, further comprising determining a classification of the human-object interaction.

8. An apparatus, comprising:
   a memory; and
   at least one processor coupled to the memory, the at least one processor being configured:
   to receive an image;

to extract a first set of features from multiple positions of the image;
to predict human-object pairs based on the extracted first set of features; and
to determine a human-object interaction based on a set of candidate interactions and the predicted human-object pairs.

9. The apparatus of clause 8, in which the at least one processor is further configured to determine the human-object pairs based on a set of geometric priors or a set of visual priors.

10. The apparatus of clause 8 or 9, in which the at least one processor is further configured to determine the set of geometric priors based on a spatial relation between a target human bounding box and a predicted human bounding box and between a target object bounding box and a predicted object bounding box.

11. The apparatus of any of clauses 8-10, in which the at least one processor is further configured to determine the set of visual priors by computing a confidence metric comparing a verb-noun classification to the image.

12. The apparatus of any of clauses 8-11, in which the at least one processor is further configured to determine the human-object pairs by comparing a score computed based on a sum of the geometric priors and visual priors to a predefined threshold.

13. The apparatus of any of clauses 8-12, in which the at least one processor is further configured to detect a human-object interaction if the score is above the predefined threshold.

14. The apparatus of any of clauses 8-13, in which the at least one processor is further configured to determine a classification of the human-object interaction.

15. An apparatus, comprising:
means for receiving an image;
means for extracting a first set of features from multiple positions of the image;
means for predicting human-object pairs based on the extracted first set of features; and
means for determining a human-object interaction based on a set of candidate interactions and the predicted human-object pairs.

16. The apparatus of clause 15, further comprising means for determining the human-object pairs based on a set of geometric priors or a set of visual priors.

17. The apparatus of clause 15 or 16, further comprising means for determining the set of geometric priors based on a spatial relation between a target human bounding box and a predicted human bounding box and between a target object bounding box and a predicted object bounding box.

18. The apparatus of any of clauses 15-17, further comprising means for determining the set of visual priors by computing a confidence metric comparing a verb-noun classification to the image.

19. The apparatus of any of clauses 15-18, further comprising means for determining the human-object pairs by comparing a score computed based on a sum of the geometric priors and visual priors to a predefined threshold.

20. The apparatus of any of clauses 15-19, further comprising means for detecting a human-object interaction if the score is above the predefined threshold.

21. The apparatus of any of clauses 15-20, further comprising means for determining a classification of the human-object interaction.

22. A non-transitory computer readable medium having encoded thereon program code, the program code being executed by a processor and comprising:
program code to receive an image;
program code to extract a first set of features from multiple positions of the image;
program code to predict human-object pairs based on the extracted first set of features; and
program code to determine a human-object interaction based on a set of candidate interactions and the predicted human-object pairs.

23. The non-transitory computer readable medium of clause 22, further comprising program code to determine the human-object pairs based on a set of geometric priors or a set of visual priors.

24. The non-transitory computer readable medium of clause 22 or 23, further comprising program code to determine the set of geometric priors based on a spatial relation between a target human bounding box and a predicted human bounding box and between a target object bounding box and a predicted object bounding box.

25. The non-transitory computer readable medium of any of clauses 22-24, further comprising program code to determine the set of visual priors by computing a confidence metric comparing a verb-noun classification to the image.

26. The non-transitory computer readable medium of any of clauses 22-25, further comprising program code to determine the human-object pairs by comparing a score computed based on a sum of the geometric priors and visual priors to a predefined threshold.

27. The non-transitory computer readable medium of any of clauses 22-26, further comprising program code to detect a human-object interaction if the score is above the predefined threshold.

28. The non-transitory computer readable medium of any of clauses 22-27, further comprising program code to determine a classification of the human-object interaction.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method, comprising:
receiving an image;
extracting a first set of human-object features from multiple positions of the image based on a learned embedding of fixed positional information;
predicting human-object pairs based on the extracted first set of human-object features; and
determining a human-object interaction based on a set of candidate interactions and the predicted human-object pairs, using a corresponding scoring matrix, the scoring matrix indicating an alignment between a candidate interaction of the set of candidate interactions and a human-object pair of the predicted human object pairs.

2. The method of claim 1, in which the human-object interaction is determined based on a set of geometric priors or a set of visual priors.

3. The method of claim 2, in which the set of geometric priors are determined based on a spatial relation between a target human bounding box and a predicted human bounding box and between a target object bounding box and a predicted object bounding box.

4. The method of claim 2, in which the set of visual priors are determined by computing a confidence metric comparing a verb-noun classification to the image.

5. The method of claim 2, in which the human-object interaction is determined by comparing a score computed based on a sum of the geometric priors and visual priors to a predefined threshold.

6. The method of claim 5 in which the human-object interaction is detected when the score is above the predefined threshold.

7. The method of claim 1, further comprising determining a classification of the human-object interaction.

8. An apparatus, comprising:
a memory; and
at least one processor coupled to the memory, the at least one processor being configured:
to receive an image;
to extract a first set of human-object features from multiple positions of the image based on a learned embedding of fixed positional information;
to predict human-object pairs based on the extracted first set of human-object features; and
to determine a human-object interaction based on a set of candidate interactions and the predicted human-object pairs, using a corresponding scoring matrix, the scoring matrix indicating an alignment between a candidate interaction of the set of candidate interactions and a human-object pair of the predicted human object pairs.

9. The apparatus of claim 8, in which the at least one processor is further configured to determine the human-object interaction based on a set of geometric priors or a set of visual priors.

10. The apparatus of claim 9, in which the at least one processor is further configured to determine the set of geometric priors based on a spatial relation between a target human bounding box and a predicted human bounding box and between a target object bounding box and a predicted object bounding box.

11. The apparatus of claim 9, in which the at least one processor is further configured to determine the set of visual priors by computing a confidence metric comparing a verb-noun classification to the image.

12. The apparatus of claim 9, in which the at least one processor is further configured to determine the human-object interaction by comparing a score computed based on a sum of the geometric priors and visual priors to a predefined threshold.

13. The apparatus of claim 12, in which the at least one processor is further configured to detect the human-object interaction if the score is above the predefined threshold.

14. The apparatus of claim 8, in which the at least one processor is further configured to determine a classification of the human-object interaction.

15. An apparatus, comprising:
   means for receiving an image;
   means for extracting a first set of human-object features from multiple positions of the image based on a learned embedding of fixed positional information;
   means for predicting human-object pairs based on the extracted first set of human-object features; and
   means for determining a human-object interaction based on a set of candidate interactions and the predicted human-object pairs, using a corresponding scoring matrix, the scoring matrix indicating an alignment between a candidate interaction of the set of candidate interactions and a human-object pair of the predicted human object pairs.

16. The apparatus of claim 15, further comprising means for determining the human-object interaction based on a set of geometric priors or a set of visual priors.

17. The apparatus of claim 16, further comprising means for determining the set of geometric priors based on a spatial relation between a target human bounding box and a predicted human bounding box and between a target object bounding box and a predicted object bounding box.

18. The apparatus of claim 16, further comprising means for determining the set of visual priors by computing a confidence metric comparing a verb-noun classification to the image.

19. The apparatus of claim 16, further comprising means for determining the human-object interaction by comparing a score computed based on a sum of the geometric priors and visual priors to a predefined threshold.

20. The apparatus of claim 19, further comprising means for detecting the human-object interaction if the score is above the predefined threshold.

21. The apparatus of claim 15, further comprising means for determining a classification of the human-object interaction.

22. A non-transitory computer readable medium having encoded thereon program code, the program code being executed by a processor and comprising:
   program code to receive an image;
   program code to extract a first set of human-object features from multiple positions of the image based on a learned embedding of fixed positional information;
   program code to predict human-object pairs based on the extracted first set of human-object features; and
   program code to determine a human-object interaction based on a set of candidate interactions and the predicted human-object pairs, using a corresponding scoring matrix, the scoring matrix indicating an alignment between a candidate interaction of the set of candidate interactions and a predicted human-object pair of the human object pairs.

23. The non-transitory computer readable medium of claim 22, further comprising program code to determine the human-object interaction based on a set of geometric priors or a set of visual priors.

24. The non-transitory computer readable medium of claim 23, further comprising program code to determine the set of geometric priors based on a spatial relation between a target human bounding box and a predicted human bounding box and between a target object bounding box and a predicted object bounding box.

25. The non-transitory computer readable medium of claim 23, further comprising program code to determine the set of visual priors by computing a confidence metric comparing a verb-noun classification to the image.

26. The non-transitory computer readable medium of claim 23, further comprising program code to determine the human-object interaction by comparing a score computed based on a sum of the geometric priors and visual priors to a predefined threshold.

27. The non-transitory computer readable medium of claim 26, further comprising program code to detect the human-object interaction if the score is above the predefined threshold.

28. The non-transitory computer readable medium of claim 22, further comprising program code to determine a classification of the human-object interaction.

* * * * *